(12) United States Patent
Murphy

(10) Patent No.: US 10,643,294 B2
(45) Date of Patent: May 5, 2020

(54) SYSTEM AND METHOD FOR STORING AND SEQUENCING LUGGAGE ITEMS

(71) Applicant: Christopher J. Murphy, Ann Arbor, MI (US)

(72) Inventor: Christopher J. Murphy, Ann Arbor, MI (US)

(73) Assignee: JERVIS B. WEBB COMPANY, Novi, MI (US)

( * ) Notice: Subject to any disclaimer, the term of this patent is extended or adjusted under 35 U.S.C. 154(b) by 0 days.

(21) Appl. No.: 14/995,013

(22) Filed: Jan. 13, 2016

(65) Prior Publication Data
US 2017/0200248 A1 Jul. 13, 2017

(51) Int. Cl.
| | |
|---|---|
| *G06Q 50/28* | (2012.01) |
| *B62D 3/00* | (2006.01) |
| *B65G 1/137* | (2006.01) |
| *B62B 3/00* | (2006.01) |
| *A45C 13/38* | (2006.01) |
| *B65G 1/04* | (2006.01) |
| *B65G 47/51* | (2006.01) |

(52) U.S. Cl.
CPC .......... *G06Q 50/28* (2013.01); *A45C 13/385* (2013.01); *B62B 3/005* (2013.01); *B65G 1/137* (2013.01); *B65G 1/0492* (2013.01); *B65G 47/5109* (2013.01); *B65G 2201/0264* (2013.01)

(58) Field of Classification Search
CPC .... A45C 13/385; B62B 3/005; B65G 1/0492; B65G 1/137; B65G 67/08; B65G 67/24; B65G 2201/0264; G05D 1/0088
See application file for complete search history.

(56) References Cited

U.S. PATENT DOCUMENTS

| | | | |
|---|---|---|---|
| 6,220,422 B1 * | 4/2001 | Lee ...................... | B65G 47/766 198/370.07 |
| 7,257,463 B2 | 8/2007 | Taguchi et al. | |
| 7,281,622 B2 * | 10/2007 | Qi .......................... | B65B 63/026 198/626.1 |
| 7,894,932 B2 | 2/2011 | Mountz et al. | |
| (Continued) | | | |

FOREIGN PATENT DOCUMENTS

| | | |
|---|---|---|
| DE | 102014003053 A1 | 9/2015 |
| JP | 2012232852 A | 11/2012 |
| (Continued) | | |

*Primary Examiner* — Abby Y Lin
*Assistant Examiner* — Renee LaRose
(74) *Attorney, Agent, or Firm* — Dickinson Wright PLLC

(57) ABSTRACT

A system and method for storing and sequencing a plurality of luggage items. The method includes receiving at least one of the luggage items into a loading area from an entrance conveyor disposed in the loading area. Once received, the luggage items are moved from the entrance conveyor onto a shelf of a container with a loading assembly. The method continues with transporting the container from the loading area to the storage area with an automatic guided vehicle with the luggage item disposed on the shelf of the container. When the luggage items are ready to be processed, the method continues with transporting the first container from the storage area to the unloading area with the automatic guided vehicle with the received luggage item disposed on the shelf of the container. Different embodiments of the loading and unloading assemblies are provided.

17 Claims, 12 Drawing Sheets

(56) References Cited

U.S. PATENT DOCUMENTS

| | | |
|---|---|---|
| 8,700,502 B2 | 4/2014 | Mountz |
| 8,725,286 B2 | 5/2014 | D Andrea |
| 8,930,133 B2 | 1/2015 | Wurman et al. |
| 2009/0224923 A1* | 9/2009 | Abraham, Jr. ...... G06K 17/0025 340/572.1 |
| 2011/0002761 A1* | 1/2011 | Aimable-Lima ......... B64F 1/32 414/340 |
| 2012/0282070 A1 | 11/2012 | D Andrea |
| 2012/0323746 A1 | 12/2012 | Mountz |
| 2013/0251480 A1* | 9/2013 | Watt ...................... B65G 49/00 414/222.01 |
| 2013/0304253 A1 | 11/2013 | Wurman et al. |
| 2014/0188671 A1 | 7/2014 | Mountz et al. |
| 2014/0195040 A1 | 7/2014 | Wurman et al. |
| 2014/0228999 A1 | 8/2014 | D'Andrea et al. |
| 2014/0241837 A1 | 8/2014 | Vanderlande |
| 2014/0330425 A1 | 11/2014 | Stevens et al. |
| 2014/0350831 A1 | 11/2014 | Hoffman et al. |
| 2015/0078867 A1 | 3/2015 | Laib et al. |
| 2015/0083549 A1 | 3/2015 | Ram |
| 2015/0114804 A1 | 4/2015 | Delaney et al. |
| 2015/0117995 A1* | 4/2015 | D'Andrea .............. G06Q 10/08 414/467 |
| 2015/0151912 A1* | 6/2015 | Mountz ................ G06Q 10/087 700/216 |
| 2015/0332213 A1* | 11/2015 | Galluzzo .................. B25J 5/007 700/216 |
| 2016/0167888 A1* | 6/2016 | Messina ............... B65G 41/008 198/315 |
| 2017/0166399 A1* | 6/2017 | Stubbs .................. B25J 9/0096 |

FOREIGN PATENT DOCUMENTS

| | | |
|---|---|---|
| JP | 2013032227 A | 2/2013 |
| JP | 2013067517 A | 4/2013 |
| JP | 2013107776 A | 6/2013 |
| WO | 2013076349 A1 | 5/2013 |

* cited by examiner

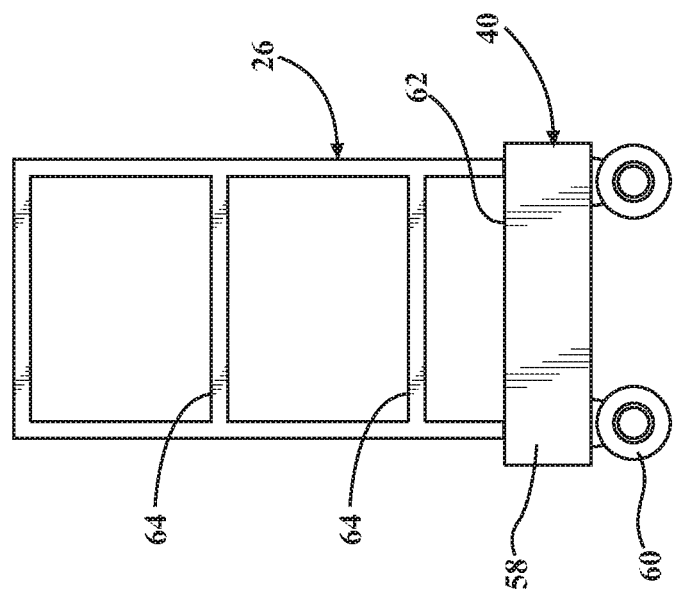
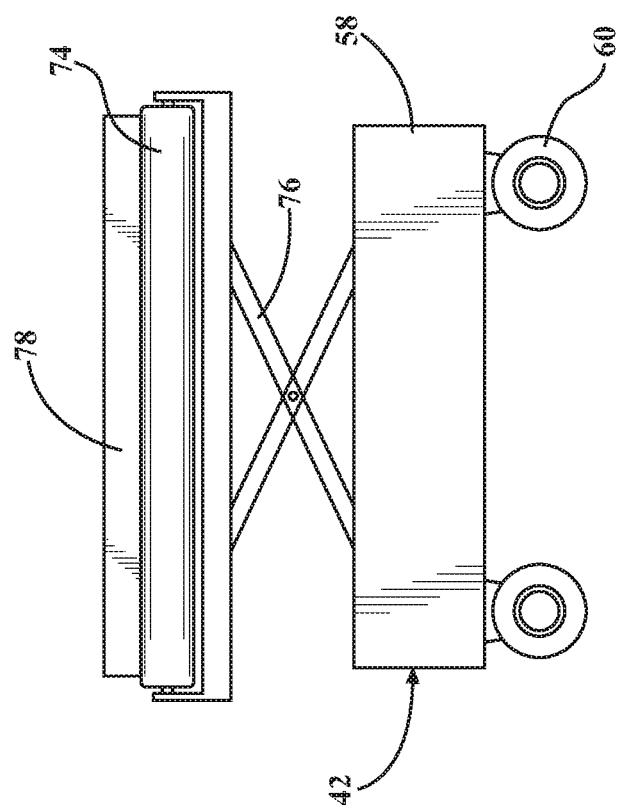
FIG. 2B
FIG. 2A

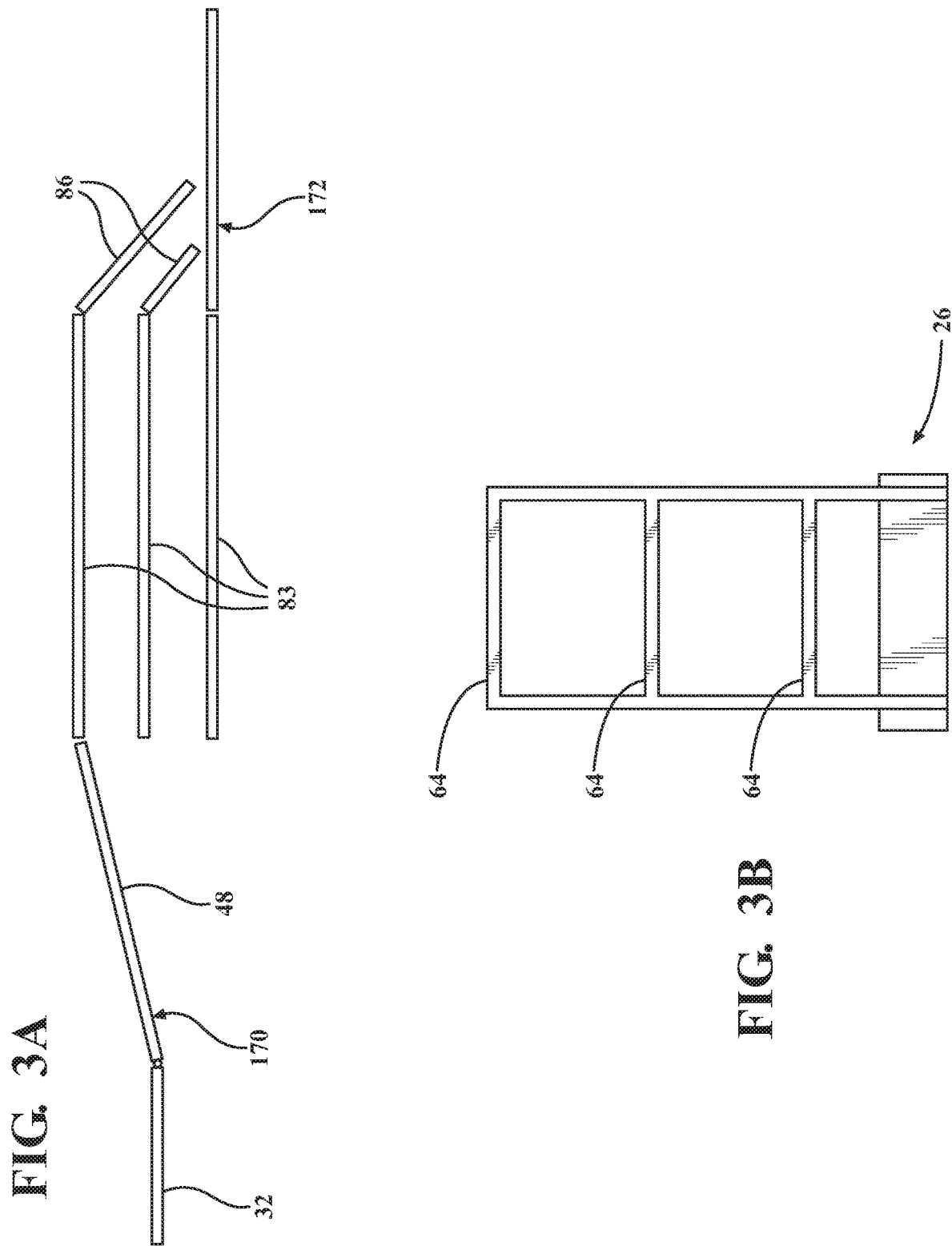

SYSTEM AND METHOD FOR STORING AND SEQUENCING LUGGAGE ITEMS

BACKGROUND OF THE INVENTION

1. Field of the Invention

A system and method for storing and sequencing a plurality of luggage items. More specifically a system and method for automatically storing, sequencing, and retrieving luggage items from a storage area.

2. Description of the Prior Art

When passengers travel via commercial conveyance methods such as on airliners, the conveyance company often allows the passengers to check their luggage items. The conveyance company and their agents, collect, process, transport, and return to the passenger the checked luggage items upon arrival at the final passenger's final destination.

During processing of the luggage items by the conveyance company, it is often necessary to hold luggage items in process for a period of time. An example of this occurs when a passenger checks in very early for a flight. That passenger's luggage items must be held until the airline is ready to load the flight.

In the current state of the art, stored luggage is managed a number of ways. For example, the stored luggage items may be manually stored in an area designated for this purpose. Such manual handling methods tend to be labor intensive, prone to worker injury, and prone to manual miss-handling error.

According to another example method, as illustrated in FIG. 1, stored luggage items may be sorted to, and accumulated on, long sections of belt conveyor. Each section of belt conveyor may hold a group of luggage items that have common attributes such as flight number or departure time window.

Certain issues associated with such conveyor storage systems have been recognized. For example, such systems require substantial floor space and capital investment. Furthermore, the handling of stored bags in large groups obviates the possibility of processing individual bags or smaller groups of bags. Such handling may be necessary when a passenger changes itinerary or when a flight schedule changes unexpectedly. When these events happen, the entire group, or entire belt section, must be re-sorted to separate the desired luggage item(s) from the group. These handling constraints impair the flexibility of these systems.

In view of the foregoing, there remains a need for improvements to systems and methods for storing and sequencing luggage items.

SUMMARY OF THE INVENTION

A first method for storing and sequencing a plurality of luggage items is provided. The method includes receiving at least one of the luggage items into a loading area from an entrance conveyor disposed in the loading area, moving the luggage item from the entrance conveyor onto a shelf of a container with a loading assembly, providing instructions to a carrier automatic guided vehicle from the control system to transport the container from the loading area to a storage area, and transporting the container from the loading area to the storage area with the carrier automatic guided vehicle with the luggage item disposed on the shelf of the container, and providing instructions to the carrier automatic guided vehicle from the control system to transport the container from the storage area to an unloading area, and transporting the container from the storage area to the unloading area with the carrier automatic guided vehicle with the received luggage item disposed on the shelf of the container.

A first system for storing and sequencing a plurality of luggage items is also provided. The system includes at least one container including a plurality of shelves being vertically stacked on top of one another; a storage area for holding the container; a loading area including an entrance conveyor for receiving the luggage items into the loading area; an unloading area including an exit conveyor for removing the luggage items from the unloading area; at least one pathway extending between the storage area, the loading area, and the unloading area; at least one carrier automatic guided vehicle for transporting the container between the storage area, the loading area, and the unloading area; a loading assembly disposed in the loading area and configured to move the luggage item from the entrance conveyor onto one of the shelves of the container; an unloading assembly disposed in the unloading area and configured to move the luggage item from the shelf of the container onto the exit conveyor; a control system wirelessly connected to the carrier automatic guided vehicle for controlling the movement of the carrier automatic guided vehicle along the at least one pathway between the storage area, the loading area, and the unloading area; and the control system further connected to the loading assembly and the unloading assembly for instructing the loading assembly to move the luggage item from the entrance conveyor onto one of the shelves of the container and for instructing the unloading assembly to move the luggage item from the shelf of the container onto the exit conveyor.

A second method for storing and sequencing a plurality of luggage items is further provided. The method includes receiving at least one of the luggage items into a loading area from an entrance conveyor disposed in the loading area; providing a container including a plurality of shelves being vertically stacked on top of one another; providing at least one loading assembly in the loading area including a packing automatic guided vehicle having a chassis, a cart belt, a lifting mechanism interconnecting the chassis and the cart belt and providing movement of the cart belt relative to the chassis, and a pusher being moveable relative to the chassis; moving the luggage item from the entrance conveyor onto the cart belt of the packing automatic guided vehicle; moving the cart belt of the packing automatic guided vehicle into alignment with a selected one of the shelves of the container; pushing the luggage item from the cart belt of the packing automatic guided vehicle onto the selected shelf of the container with the pusher; and transporting the container from the loading area to the storage area with a carrier automatic guided vehicle with the luggage item disposed on the selected shelf of the first container.

A second system for storing and sequencing a plurality of luggage items is also provided. The system includes: at least one container including a plurality of shelves being vertically stacked on top of one another; a storage area for holding the container; a loading area including an entrance conveyor for receiving the luggage items into the loading area; a loading assembly disposed in the loading area including a packing automatic guided vehicle having a chassis and a cart belt supported by the chassis for holding the luggage items; the packing automatic guided vehicle further including a lifting mechanism interconnecting the chassis and the cart belt and providing movement of the cart belt relative to the chassis for aligning the cart belt with one of the shelves of the container; and the packing automatic guided vehicle further including a pusher being moveable with the cart belt for pushing the luggage item from the cart belt onto the shelf of the container.

A third method for storing a plurality of luggage items is further provided. The method includes receiving at least one of the luggage items into a loading area from an entrance conveyor disposed in the loading area; providing a container including a plurality of shelves being vertically stacked on top of one another; providing at least one loading assembly in the loading area including a plurality of platform conveyors disposed in vertically stacked relationship with one another with each of the platform conveyors disposed at the same height as one of the shelves of the container, a loading conveyor extending from the entrance conveyor and pivotable relative to the entrance conveyor for being aligned with one of the platform conveyors, and a plurality of first pushing devices each disposed at the same height as one of the platform conveyors; pivoting the loading conveyor into alignment with a selected one of the platform conveyors; moving the luggage item from the entrance conveyor to the selected first platform conveyor with the loading conveyor; pushing the luggage item from the selected first platform conveyor onto a selected one of the shelves of the container with the pushing device; and transporting the container from the loading area to the storage area with a carrier automatic guided vehicle with the luggage item disposed on the selected shelf of the first container.

A third system for storing and sequencing a plurality of luggage items is also provided. The system includes at least one container including a plurality of shelves being vertically stacked on top of one another; a storage area for holding the container; a loading area including an entrance conveyor for receiving the luggage items into the loading area; a loading assembly disposed in the loading area including a plurality of platform conveyors disposed in vertically stacked relationship with one another with each of the platform conveyors disposed at the same height as one of the shelves of the container; and the loading assembly further including a loading conveyor extending from the entrance conveyor and pivotable relative to the entrance conveyor for being aligned with one of the platform conveyors for moving the luggage item from the entrance conveyor onto one of the platform conveyors, and a plurality of pushing devices each disposed at the same height as one of the platform conveyors for pushing the luggage item from the platform conveyor onto one of the shelves of the container.

A fourth method for storing and sequencing a plurality of luggage items is further provided. The method includes receiving a plurality of luggage items into a loading area from an entrance conveyor disposed in the loading area; moving each of the luggage items from the entrance conveyor onto a shelf of one of a plurality of containers with a loading assembly; and providing instructions to a carrier automatic guided vehicle from a control system to transport each of the containers having luggage items disposed thereon to a loaded region of a storage area that is separate from an unloaded region of the storage area which includes at least one container without luggage items stored thereon.

A fourth system for storing and sequencing a plurality of luggage items is also provided. The system includes a loading area including an entrance conveyor for receiving luggage items into the loading area; a plurality of carriers each including at least one shelf for receiving a luggage item from the loading area; a storage area including a loaded region for receiving a plurality of the containers with luggage items disposed thereon and an unloaded region for receiving a plurality of the containers without luggage items disposed thereon; an automatic guided vehicle configured to transport the containers; and a control system wirelessly connected to the carrier automatic guided vehicle for controlling the movement of the carrier automatic guided vehicle and programmed to instruct the automatic guided vehicle to transport the containers with luggage items disposed thereon to the loaded region of the storage area and to transport the containers without luggage items disposed thereon to the unloaded region of the storage area.

A fifth method for storing and sequencing a plurality of luggage items is further provided. The method includes receiving at least one of the luggage items into a loading area from an entrance conveyor disposed in the loading area; programming a first bag ID into a control system, wherein the first bag ID includes information related to the received luggage item; moving the luggage item from the entrance conveyor onto a shelf of a first container with a loading assembly; providing instructions to a material handling device from the control system to transport the first container from the loading area to a storage area, and transporting the first container from the loading area to the storage area with the material handling device with the luggage item disposed on the shelf of the first container; changing the first bag ID to a second bag ID with the control system in response to a change in a status of the received luggage item, wherein the second bag ID includes information related to the received luggage item that is different from the information of the first bag ID; and providing instructions to the material handling device from the control system to transport the first container from the storage area to an unloading area in response to a detection of the first bag ID being changed to the second bag ID, and transporting the first container from the storage area to the unloading area with the material handling device with the received luggage item disposed on the shelf of the first container.

The invention in its broadest aspect therefore may be utilized to reliably and efficiently store and sequence luggage items that arrive at any time while occupying minimal building space.

Furthermore, capital costs of implementing the subject system and method are inexpensive because the system utilizes few components. Moreover, labor costs associated with the subject system and method are inexpensive since the system may be operated substantially autonomously.

Additionally, the capabilities of the system may easily and inexpensively be expanded and reduced since the various components of the system are easily integrated and removed into/from preexisting systems.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2A is a side view of an example embodiment of a packing automatic guided vehicle according to an aspect of the disclosure;

FIG. 2B is a side view of an example embodiment of a carrier automatic guided vehicle according to an aspect of the disclosure;

FIG. 3A is a schematic side view of loading and unloading mechanisms of the second example embodiment of a baggage handling area;

FIG. 3B is a side view of an embodiment of a container according to an aspect of the disclosure illustrating that the shelves of the container may be disposed at substantially the same vertical height as the platform conveyors;

DESCRIPTION OF THE ENABLING EMBODIMENT

Referring to the Figures, wherein like numerals indicate corresponding parts throughout the several views, a system and method for storing and sequencing a plurality of luggage items 20 is provided. The example embodiments demonstrate how the subject system and method may be utilized to store and sequence checked-in luggage items 20 in an airport, however, it should be appreciated that the subject system and method can be utilized to store and sequence luggage items 20 in other transportation hubs including, but not limited to, train stations, bus stations and marinas.

Figure 1:
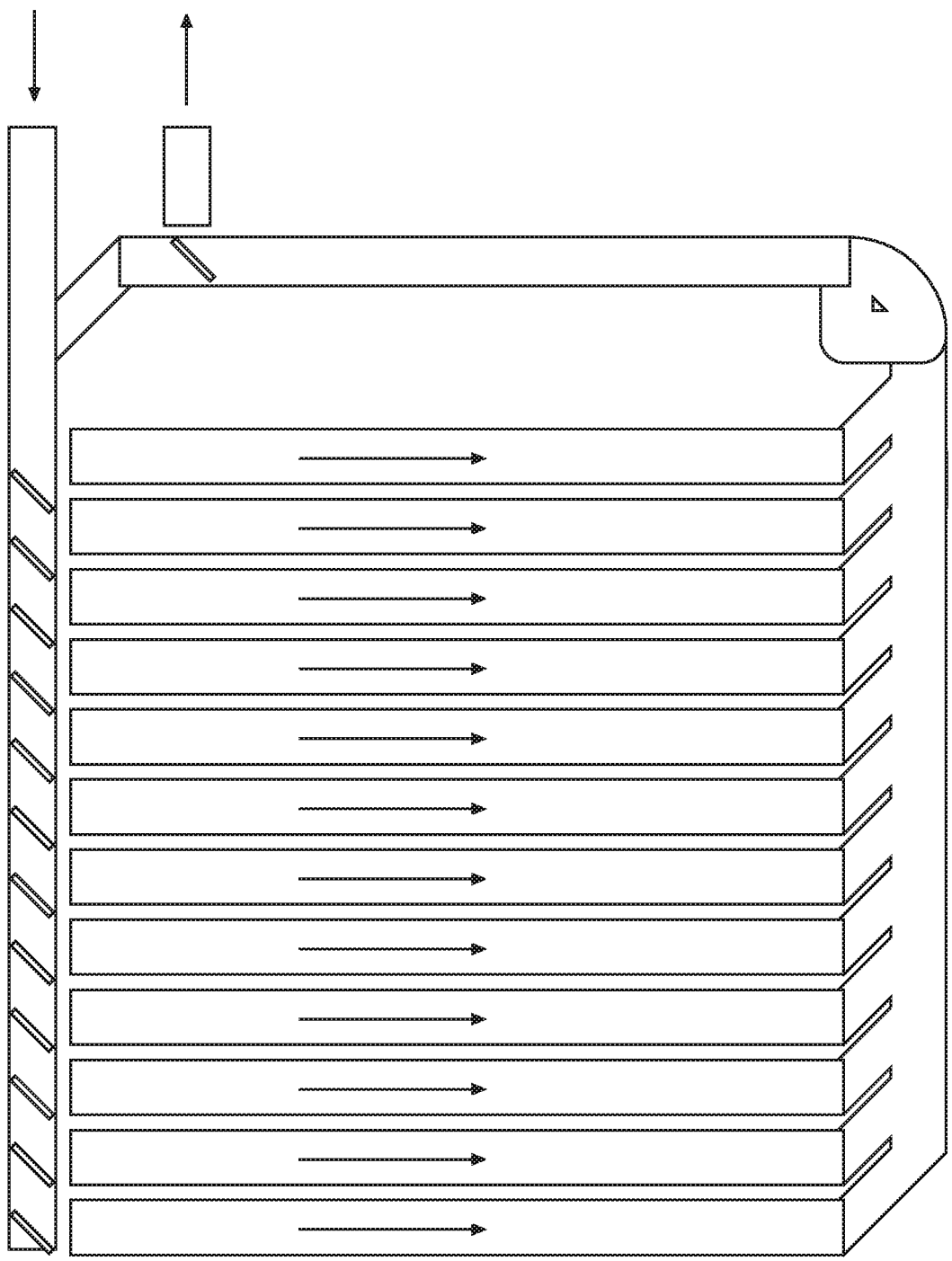
FIG. 1 is a top view of an example of a prior art belt conveyor style baggage handling area.
Figure 2:
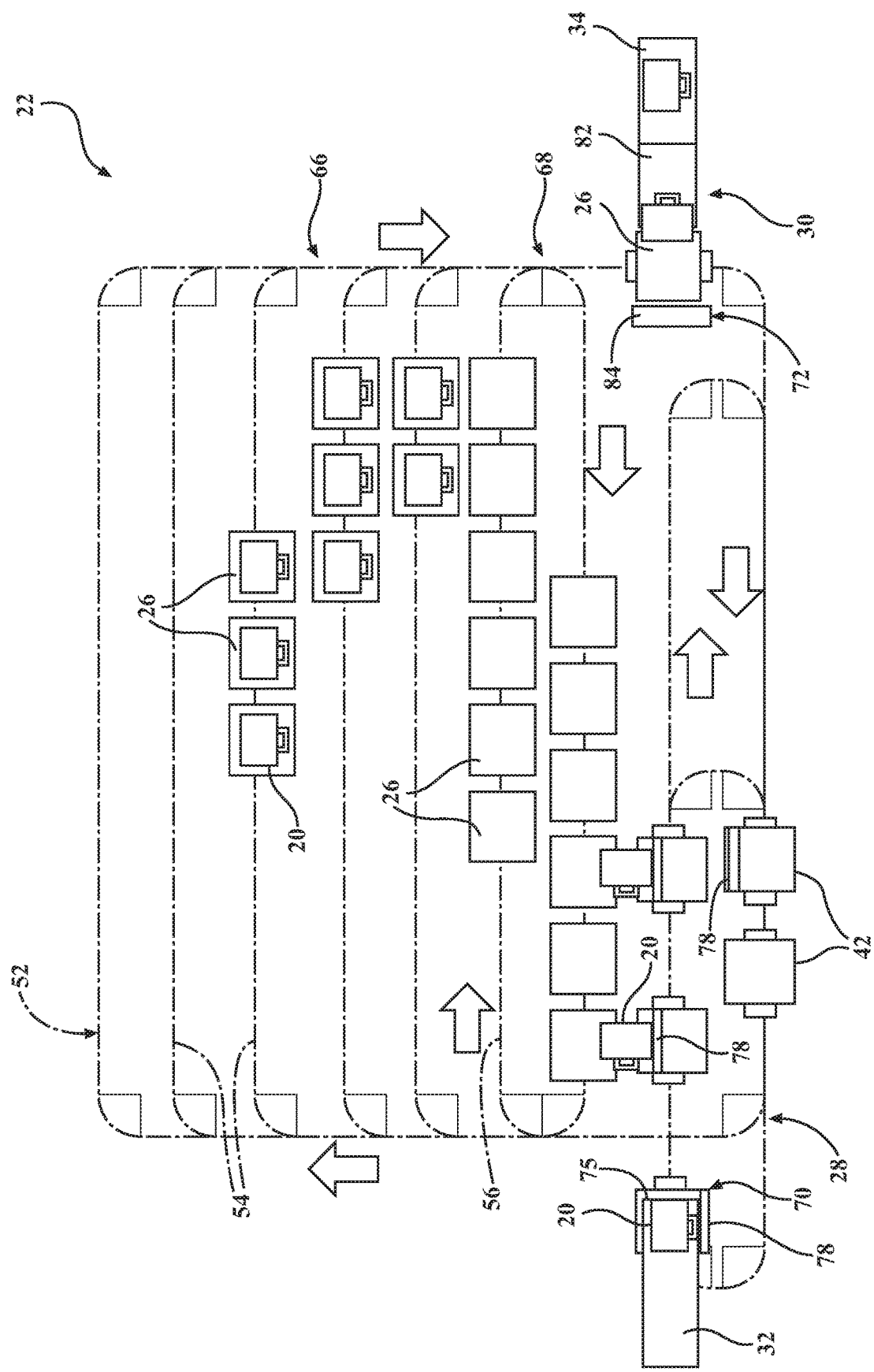
FIG. 2 a top view of a first example embodiment of a baggage handling area according to a first aspect of the disclosure.
Figure 3:
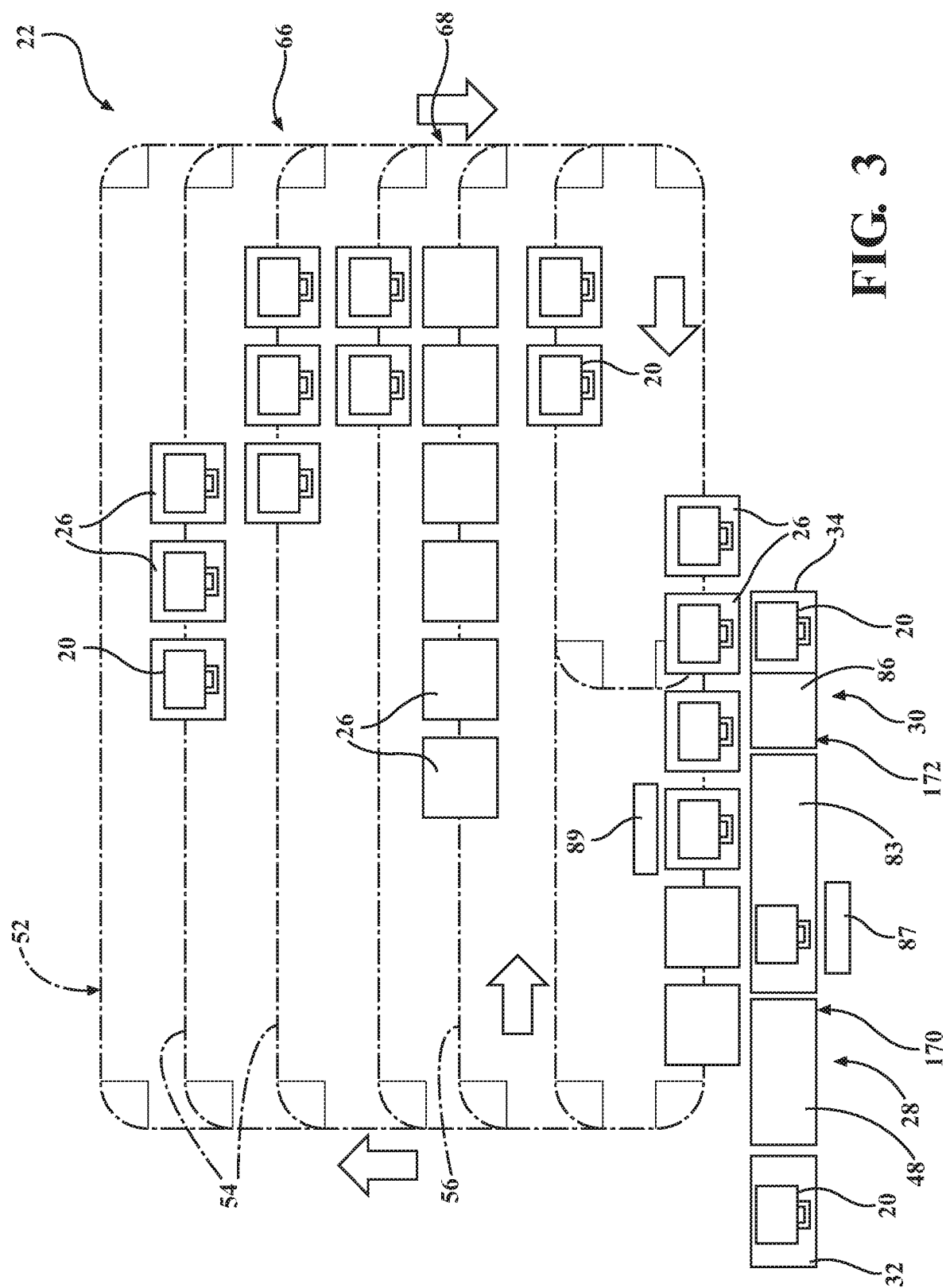
FIG. 3 is a top view of a second example embodiment of a baggage handling area according to an aspect of the disclosure.

With reference to FIGS. 2 and 3, the system includes a baggage handling area 22. The baggage handling area 22 includes a storage area 66, 68 for storing a plurality of containers 26, a loading area 28 at which the containers 26 are loaded with one or more luggage items 20, and an unloading area 30 at which the luggage items 20 are unloaded from the containers 26. The baggage handling area 22 may be in a mezzanine or other suitable area of the airport or other facility.

An entrance conveyor 32 is positioned in the loading area 28 which delivers luggage items 20 into the loading area 28. In the example embodiments, the entrance conveyor 32 is a belt-style conveyor which ultimately extends from a check-in area of the airport. As such, the entrance conveyor 32 delivers baggage items into the loading area 28 that have been checked-in by passengers. It should be appreciated that the entrance conveyor 32 may receive baggage items from other locations.

Similarly, an exit conveyor 34 is positioned in the unloading area 30 which removes the luggage items 20 from the unloading area 30. In the example embodiments, the exit conveyor 34 is a belt-style conveyor which ultimately extends to one or more sort stations of the airport. Once the luggage items are received at the sorting station, they are sorted and loaded onto an airplane. It should be appreciated that the exit conveyor 34 could be configured to transport the luggage items 20 to other locations.

The system further includes one or more material handling devices 40, 42 for transporting the containers 26 and/or luggage items 20 within the baggage handling area 22 and for loading the luggage items 20 onto the containers 26. In the example embodiments, the material handling devices 40, 42 are automatic guided vehicles 40, 42, however it should be appreciated that other types of material handling devices, e.g., overhead conveyors, may be utilized in certain operations of the system. As will be discussed in greater detail below, each of the automatic guided vehicles 40, 42 are programmed to automatically, i.e., without a human driver, move through the baggage handling area 22 based on instructions provided by a control system 50. It should be appreciated that any number of automatic guided vehicles 40, 42 could be utilized and it is advantageously easy to add and remove automatic guided vehicles 40, 42 to/from the baggage handling area 22. It should also be appreciated that the containers 26 may be moved and loaded/unloaded manually as needed.

A pathway 52 is disposed on the ground of the baggage handling area 22 on which the automatic guided vehicles 40, 42 are configured to follow based on instructions provided by the control system 50. The pathway 52 includes numerous segments 54, 56 that extend to different parts of the baggage handling area 22. Namely, the segments 54, 56 of the pathway extend to the storage area 66, 68, loading area 28, 128 and unloading area 30, 130. The pathway 52 may take various forms including, but not limited to, magnetic markers or wires on the floor. Further, the pathway 52 may be electronically mapped into software of the control system 50 such that the automatic guided vehicle may be programmed to automatically move along programmed segments 54, 56 of the pathway 52 via coordinate mapping using GPS or other technologies.

As best shown in FIG. 2B, the plurality of material handling devices 40, 42 includes a plurality of carrier automatic guided vehicles 40 that are utilized for transporting the containers 26 within the baggage handling area 22. The carrier automatic guided vehicles 40 each include a chassis 58, a plurality of wheels 60 that are connected to the chassis 58 for establishing rolling movement of the carrier automatic guided vehicle 40, and a support surface 62 disposed on the chassis 58 for removeably supporting one of the containers 26. It should be appreciated that other configurations of the carrier automatic guided vehicles 40 could be utilized. For example, the carrier automatic guided vehicles 40 could be configured to push or pull the containers 26 rather than carry the containers 26.

As further shown in FIG. 2B, each of the containers 26 that are transported by the carrier automatic guided vehicles 40 include a plurality of vertically-stacked shelves 64. In the example embodiments, three shelves 64 are utilized, and the shelves 64 are sized to each receive a single luggage item 20. However, it should be appreciated that any number of shelves 64 could be utilized, and the shelves 64 could be sized to receive more than one luggage item 20. It should be appreciated that the containers 26 could be configured such that they are collapsible to reduce to the size of the containers 26 while stored.

With reference back to FIGS. 2 and 3, the storage area 66, 68 is divided into a loaded region 66 for receiving a plurality of the containers 26 after they have received luggage items 20, and an unloaded region 68 for storing empty containers 26. More specifically, a plurality of segments, e.g., lanes, of the pathway 52 are designated as loaded region segments 54 and a plurality of segments of the pathway 52 are designated as unloaded region segments 56, thus allowing the carrier automatic guided vehicles 40 to be directed to a predetermined region based on instructions provided by the control system 50. As shown, the unloaded region segments 56 are positioned closer to the loading and unloading areas 28, 30 than the loaded region segments 54, thereby allowing unloaded containers 26 to be provided to the loading area 28, 128 quickly as needed.

It should be appreciated that the sizes of the loaded and unloaded regions 66, 68 may vary depending on current needs. More specifically, the number and location of the segments of the pathway 52 that are utilized to designate the loaded and unloaded regions 66, 68 may be dynamically changed depending on current needs. For example, as the loaded region 66 empties in response to luggage items 22 being unloaded, the number of segments of the pathway 52 that are designated for the unloaded region 68 may increase. On the other hand, the number of segments of the pathway 52 that are designated for the loaded region 66 may increase as more luggage items 22 are loaded onto the containers 26. Additionally, the length of each segment that is utilized may be varied.

It should also be appreciated that the configurations of the loaded and unloaded regions 66, 68 allow the containers 26 to be densely packed, thereby minimizing the storage space required large numbers of containers 26. It should further be appreciated that the overall size of the baggage handling area 22 may be easily varied due to the flexible nature of the system provided by the moveable containers 26 and automatic guided vehicles 40, 42. More specifically, it is advantageously easy to add and remove the components to/from the system, and it is easy to change the size and shape of the pathways 52.

A loading assembly 70, 170 is disposed in the loading area 28, 128. The loading assembly 70, 170 is configured to move the luggage items 20 from the entrance conveyor 32 onto the shelves 64 of the containers 26. Similarly, an unloading assembly 72, 172 is disposed in the unloading area 30, 130. The unloading assembly 72, 172 is configured to move the luggage item 20 from the shelf 64 of the container 26 onto the exit conveyor 34. The control system 50 is electrically connected to the loading and unloading assemblies 70, 72 for instructing the loading and unloading assemblies 70, 72 to load/unload the luggage items 20 at predetermined times.

Although the loading and unloading assemblies 70, 170, 72, 172 are separate devices in the example embodiments, it should be appreciated that they could be combined as a single device. In such a configuration, the device could be equipped with conveyors that are configured to run in different directions depending on whether the device is in a loading or unloading state. It should also be appreciated that more than one loading assembly 70, 170 and unloading assembly 72, 172 may be utilized to increase the speed at which luggage items 20 are processed. If more than one loading assembly 70, 170 is utilized, specific loading assemblies 70, 170 may be assigned by the control system 50 to load specific containers 26 with luggage items 20 having specific predetermined characteristics/bag IDs.

A first example embodiment of the loading assembly 70 is provided in FIGS. 2 and 2A. In this embodiment, the loading assembly 70 includes one or more packing automatic guided vehicles 42. Like the transportation automatically guided vehicles 40, 42, the packing automatic guided vehicles 42 each include, a chassis 58 and a plurality of wheels 60 that are connected to the chassis 58 for providing rolling movement of the packing automatic guided vehicle 42 across the ground. The packing automatic guided vehicles 42 also include a horizontally-oriented cart belt 74 of the belt-conveyor type that is supported by the chassis 58 for holding the luggage items 20 and moving the luggage items 20 relative to the chassis 58. In the example embodiment, the cart belt 74 is oriented such that the direction of travel on the cart belt 74 is orthogonal to the direction of travel of the packing automatic guided vehicle 42. It should be appreciated, however, that it could travel in other directions.

The packing automatic guided vehicles 42 each further include a lifting mechanism 76 that interconnects the chassis 58 and the cart belt 74 and provides vertical movement of the cart belt 74 relative to the chassis 58. The lifting mechanism 76 is utilized for aligning the cart belt 74 with one of the shelves 64 of the container 26 and for lowering the cart belt 74 such that it is positioned below the entrance conveyor 32. It should be appreciated that various types of lifting mechanisms 76 may be utilized including, but not limited to, a scissor lift, and any suitable actuator, e.g., hydraulic or electric, may be utilized for providing the movement of the lifting mechanism 76.

The packing automatic guided vehicles 42 each further including a pusher 78 that is moveable with the cart belt 74 for pushing the luggage item 20 from the cart belt 74 onto the shelf 64 of the container 26 when the shelf 64 and cart belt 74 are disposed in vertical and horizontal alignment with one another. In the example, embodiment, the pusher 78 is a semi-rigid flap that extends from the cart belt 74 and is disposed across the direction of travel of the cart belt 74. It should be appreciated that the pusher 78 could have other configurations.

A first example embodiment of the unloading assembly 72 is also provided in FIG. 2. The unloading assembly 72 includes a chute 82 that is pivotable relative to the exit conveyor 34 for being selectively aligned with one of the shelves 64 of the container 26 such that the luggage items 20 may slip down the chute 82 to the exit conveyor 34. The chute 82 includes an appropriate actuating mechanism for providing the pivoting movement of the chute 82. It should be appreciated that rather than using a single chute 82, a plurality of chutes that each extend to one of the shelves 64 could be utilized.

The unloading assembly 72 further includes a plurality of pushing mechanisms 84 that are each disposed at the height of one of the shelves 64 of the container 26 for pushing the luggage item 20 from the shelves 64 onto the chute 82 for moving the luggage item 20 from the shelf 64 to the exit conveyor 34. It should be appreciated that rather than using a plurality of pushing mechanisms 84, a single pushing mechanism 84 that is vertically or pivotably moveable could be utilized. It should also be appreciated that various types of pushing mechanisms 84 may be utilized, e.g., a horizontally extending member, and any type of suitable actuator may be utilized to move the pushing mechanism 84.

According to an embodiment, a luggage item 20 that is pushed from the lowermost shelf 64 may be received on the exit conveyor 34 and moved against the chute 82 by the exit conveyor 34 such that it bumps the chute 82. The chute 82 may be configured to pivot up, allowing the luggage item 20 to continue traveling under the chute 82 on the exit conveyor 34. The chute 82 may be counterbalanced such that a minimal force is required to pivot the chute 82 up, but then return to the down position when the luggage item 20 has cleared the end of the chute 82.

A second example embodiment of the loading assembly 170 is provided in FIGS. 3-3B. The loading assembly 170 includes a plurality of vertically stacked platform conveyors 83 of the belt-conveyor style. Each of the platform conveyors 83 are disposed at approximately the same height as one of the shelves 64 of the containers 26, thus allowing easy transfer of luggage items 20 between the platform conveyors 83 and shelves 64.

The loading assembly 170 further includes a loading conveyor 48 of the belt-conveyor style that extends from the entrance conveyor 32 and is pivotable relative to the ground for being aligned with one of the platform conveyors 83. Once in alignment with one of the platform conveyors 83, the loading conveyor 48 provides transportation of the luggage items 20 from the entrance conveyor 32 onto one of the platform conveyors 83.

Furthermore, the loading assembly 170 includes a plurality of first pushing devices 87 that are each disposed at the same height as one of the first platform conveyors 83. The first pushing devices 87 are configured to push the luggage item 20 from the platform conveyor 83 onto one of the shelves 64 of the container 26 when the shelf 64 is disposed in horizontal alignment with the platform conveyor 83. Accordingly, during operation of the loading assembly 170, once the luggage item 20 is received on the platform conveyor 83 from the loading conveyor 48, the platform conveyor 83 may be activated to horizontally move the luggage item 20 into alignment with a pushing device 87 to allow the pushing device 87 to push the luggage item 20 onto the shelf 64.

A second example embodiment of the unloading assembly 172 is also shown in FIG. 3-3B. The unloading assembly 172 includes a plurality of second pushing devices 89 that are each disposed at the same height as one of the second platform conveyors 83. The second pushing devices 89 are configured to push the luggage item 20 from the shelf 64 of the container 26 onto one of the second platform conveyors 83.

It should be appreciated that rather than using a plurality of either the first and second pushing devices 87, 89, a single pushing device that is vertically and/or pivotably moveable could be utilized. It should also be appreciated that various types of pushing devices may be utilized, e.g., a horizontally extending member, and various types of actuators may be utilized to move the pushing devices.

The unloading assembly 172 further includes plurality of slides 86 that each extend from the exit conveyor 34 to one of the platform conveyors 83 for providing movement of the luggage item 20 from the platform conveyors 83 to the exit conveyor 34 after the luggage item 20 has been pushed onto one of the slides 86 by the platform conveyor 83. It should be appreciated that rather than using a plurality of slides 86, a single slide that is pivotably connected to the exit conveyor 34 could be utilized.

Although the plurality of platform conveyors 83 are shared by the loading and unloading devices 170, 172 in the example embodiments, each of these systems could alternatively utilize a respective set of platform conveyors 83.

Figure 4:
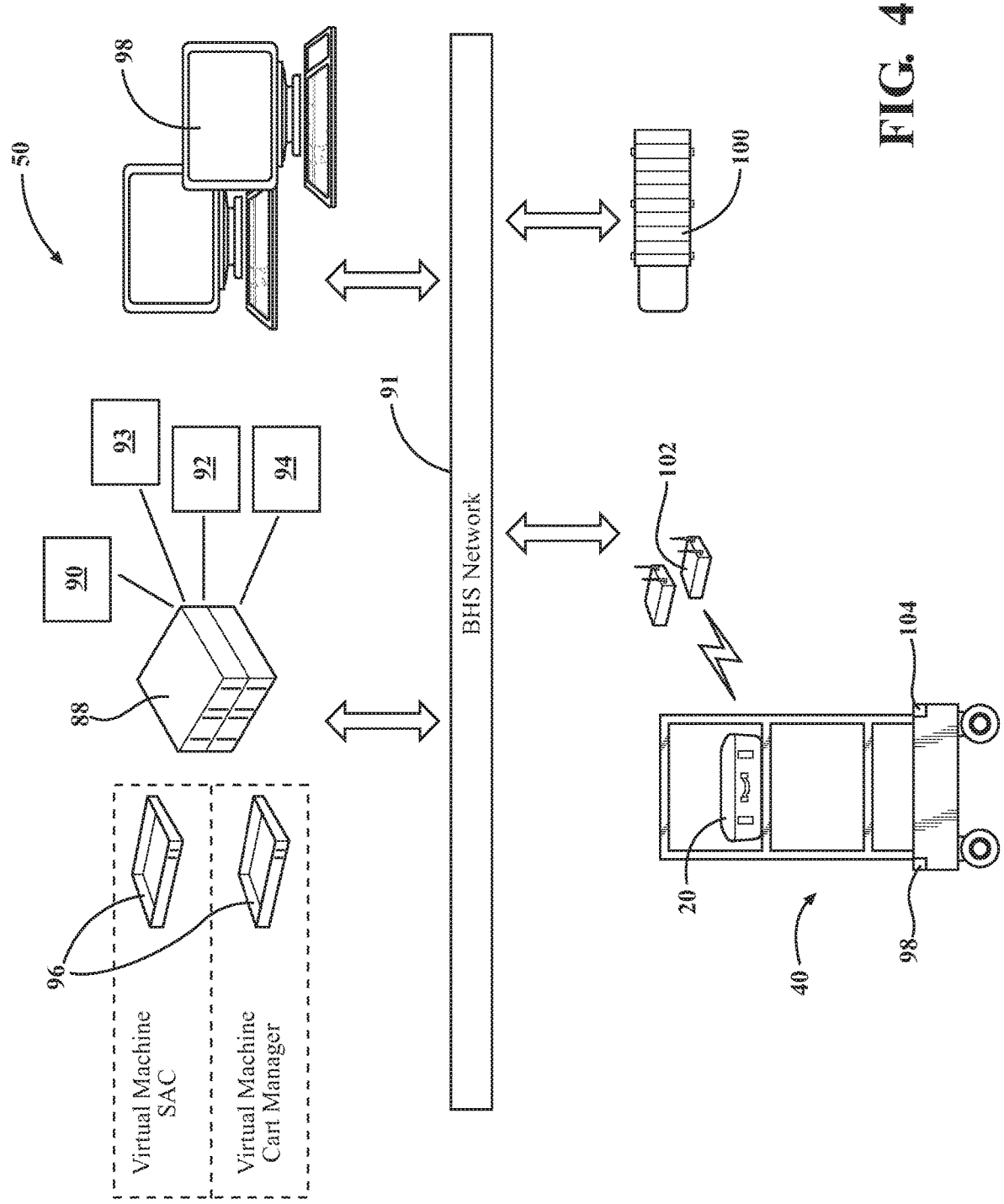
FIG. 4 is a schematic illustration of components of an example embodiment of a control system that may be utilized in conjunction with the subject baggage handling area.
Figure 5:
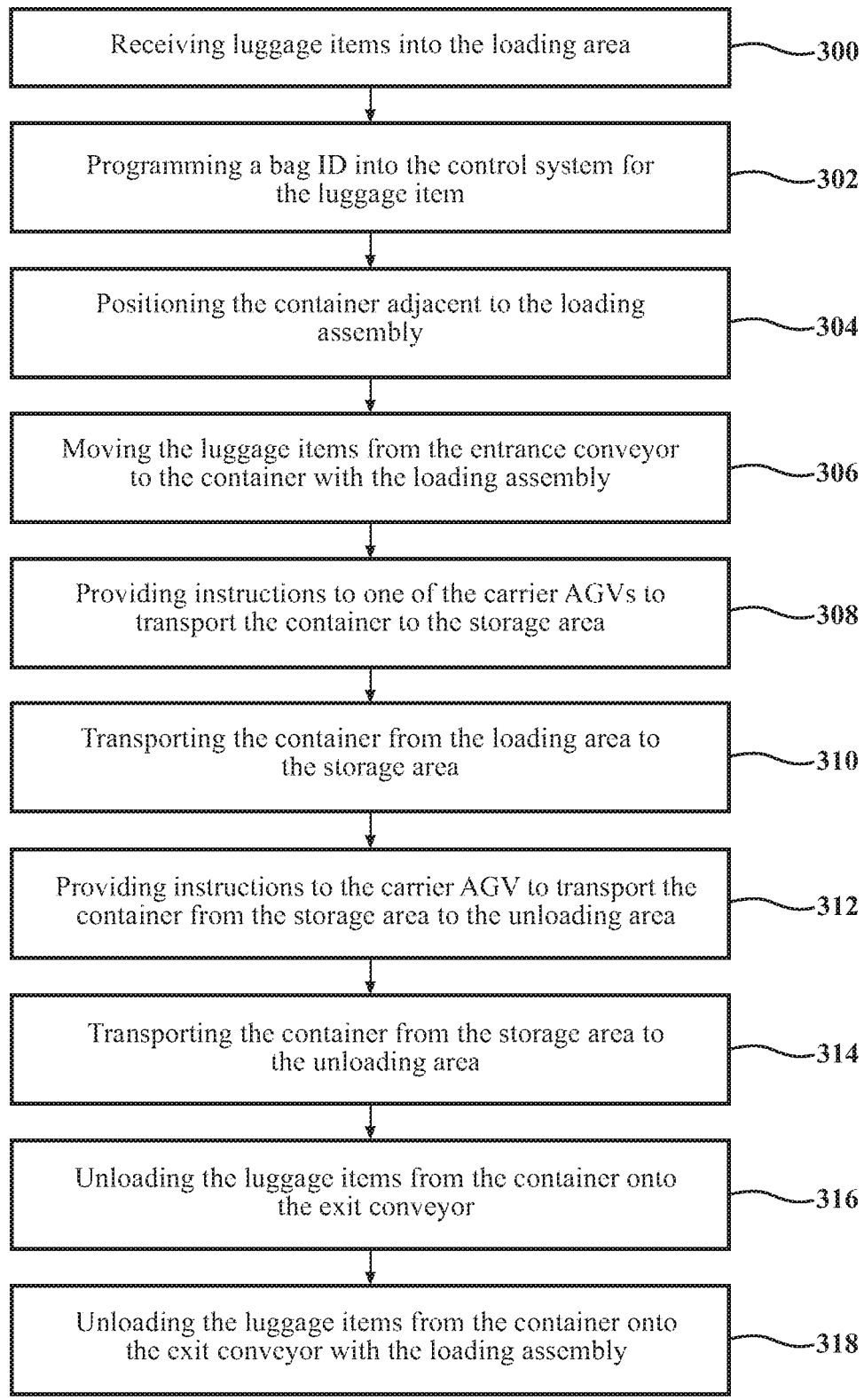
FIG. 5 is a first example method of storing and sequencing luggage items.
Figure 6:
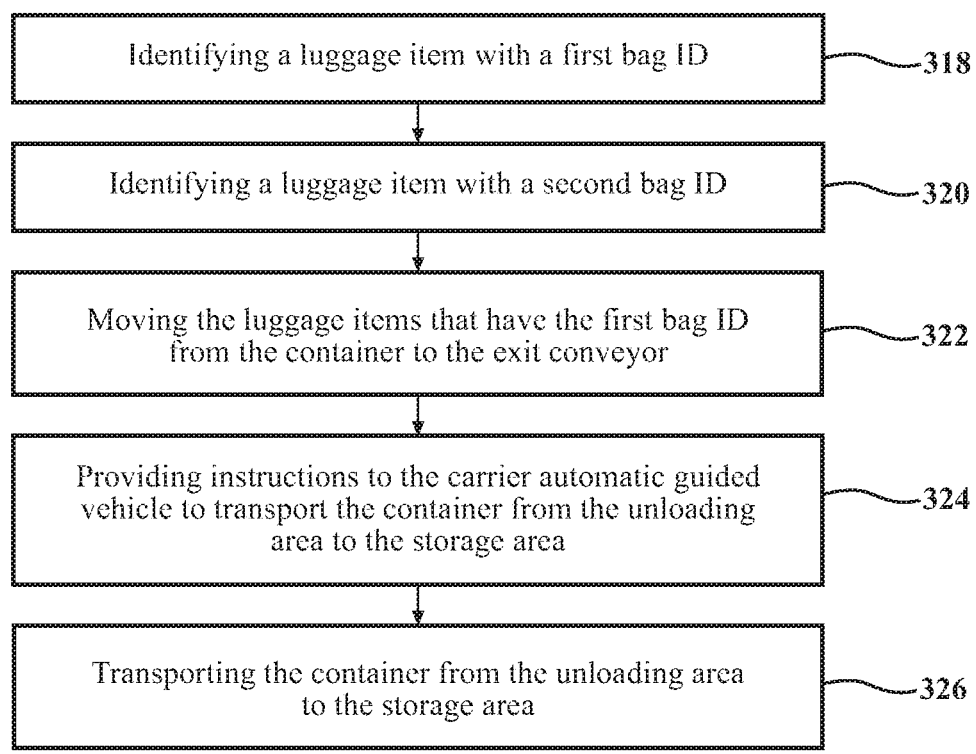
FIG. 6 is a second example method of storing and sequencing luggage items.

FIG. 4 is a schematic diagram of components of the control system 50 that controls the various components of the baggage handling area 22. As briefly mentioned above, the control system 50 is wirelessly connected to the automatic guided vehicles 40, 42 for controlling the movement of the automatic guided vehicles 40, 42 along the at least one pathway 52 between the storage area 66, 68, the loading area 28, and the unloading area 30. The control system 50 includes a Baggage Handling System (BHS) Network 91 for connecting to the various components of the baggage handling area 22. The control system 50 further includes one or more primary and backup servers 88 for hosting the BHS network and storing network information on one or more databases of the servers 88. More specifically, a data record containing inputs such as bag ID information on each luggage item 20 and information related conditions within the baggage handling area 22 are stored on databases of the servers 88. The bag ID information may include information such as, but not limited to, flight departure time, flight destination, flight number, class of service, and a priority indicator that correlates with each specific luggage items 20.

More specific aspects of the servers 88 include a data store 90 that includes a computer readable medium that has a program of instructions for prioritizing automatic movement of the automatic guided vehicles 40, 42. The servers 88 may also include a processor 92 for executing the program of instructions. The server 88 may further include a luggage information receiver 93 that is configured to receive the bag ID information/conditions of the baggage handling area 22. The server 88 also includes an instructions communicator 94 that is configured to communicate with the BHS Network to move the automatic guided vehicles 40, 42 and process the luggage items 20 based on conditions within the baggage handling area 22. The servers 88 may be embodied as one or more physical computers or as one or more virtual machines 96.

The control system 50 also includes one or more graphical user interfaces 98 that are connected to the BHS Network for presenting network information to agents of the network. One or more of the graphical user interfaces 98 may be disposed on each of the automatic guided vehicles 40, 42. The graphical user interfaces 98 may further be disposed at other locations with the baggage handling area 22.

Furthermore, a plurality of programmable logic controllers 100 are connected to the network for activating and deactivating components of the baggage handling area 22, e.g., conveyors. The control system 50 also includes one or more wireless access points 102 that are connected to the network for providing wireless access to components of the baggage handling area 22, including the automatic guided vehicles 40, 42.

A cart computer 104 (schematically shown), is disposed on each of the automatic guided vehicles 40, 42 and is electrically connected to the BHS Network via the wireless access point 102 for transmitting and receiving information over the BHS Network for controlling the movement of the automatic guided vehicles 40, 42 along different sections of the pathway 52. Said another way, during operation of the automatic guided vehicles 40, 42 within the baggage handling area 22, the cart computers 104 of the automatic guided vehicles 40, 42 receive instructions from the control system 50 to move the automatic guided vehicles 40, 42 along specific segments of the pathway 52 based on the bag ID information that is associated with each specific luggage item 20.

The cart computer 104 of each automatic guided vehicles 40, 42 is electrically connected with the graphical user interface 98 on each of the automatic guided vehicles 40, 42 for allowing agents that work in the baggage handling area 22 to view the bag ID information associated with each luggage item 20, to transmit information to the control system 50, and to program movement of the automatic guided vehicles 40, 42. The graphical user interface 98 on each of the automatic guided vehicles 40, 42 may be configured as a touch screen to allow the agent to input information into the cart computer 104. Alternatively, one or more stand-alone input devices 36, 38, e.g., a keyboard and mouse, may be utilized to allow the agent to input information into the cart computer 104.

In view of the foregoing, it should be appreciated that the combination of the control system 50 and automatic guided vehicles 40, 42 allow the system to be operated substantially autonomously. This may advantageously improve quality and throughput and reduce labor expenses. It should further be appreciated that the throughput capabilities of the baggage handling area 22 may easily and inexpensively be expanded or reduced since the components, i.e., automatic guided vehicles 40, 42, containers 26, etc. are relatively inexpensive and easily integrated or removed from preexisting systems.

With reference to FIGS. 5-13, methods of storing and sequencing luggage items 20 are also disclosed. A first example method that is presented in FIG. 5 starts with 300 receiving one or more of the luggage items 20 into the loading area 28 from the entrance conveyor 32. Before or after each luggage item 20 is received into the loading area 28, the method includes 302 programming a bag ID into the control system 50 for the luggage item 20. As previously mentioned, the bag ID includes information related to the specific luggage item 20 including, but not limited to, flight departure time, flight number, class of service, and destination. It should be appreciated that the first bag ID may be programmed in various ways including, but not limited to, a hand scanning device disposed in the baggage handling area 22, or by way of computers stationed in the check-in area of the airport.

The method continues with 304 positioning a container 26 adjacent to the loading assembly 70, 170 with the carrier automatic guided vehicle 40. Once the container 26 is positioned adjacent to the loading assembly 70, 170, the method proceeds by 306 moving each of the luggage items 20 from the entrance conveyor 32 onto a shelf 64 of the first container 26 with the loading assembly 70, 170. In the example embodiments, only one luggage item 20 is disposed on each shelf 64, however, it should be appreciated that more than one luggage item 20 could be received by each shelf 64. The control system 50 may instruct the loading assembly 70, 170 to continue to position luggage items 20 onto shelves 64 of the container 26 until each until a predetermined number of shelves 64 are filled.

As the luggage items 20 are positioned in the containers 26, the control system 50 maintains an inventory of where the luggage items 20 and containers 26 are located. Furthermore, luggage items 20 may be assigned to specific containers 26 prior to loading the luggage items 20 onto the containers 26. More specifically, the control system 50 may load each container 26 with luggage items 20 that based on predetermined criteria, e.g., luggage items 20 that have the same bag ID as one another. These grouping criteria may be selected based on container 26 retrieval optimization. For example, if all the luggage items 20 in a container 26 have a bag ID that designates them for the same flight, when that container 26 is retrieved, all of the bags in that container 26 are unloaded, thus minimizing the number of containers 26 handled.

After the containers 26 have been loaded, the method proceeds by 308 providing instructions to one of the carrier automatic guided vehicle 40 from the control system 50 to transport the container 26 from the loading area 28 to the loaded region 66 of the storage area 66, 68, and subsequently 310 transporting the first container 26 from the loading area 28 to the loaded region 66 of the storage area 66, 68 with the luggage item 20 disposed on the shelf 64 of the first container 26. It should be appreciated that the containers 26 may be transported to the loaded region 66 of the storage area 66, 68 by following the appropriate segments 54, 56 of the pathway 52.

In the event that a partially empty container 26 is transferred to the storage area 66, 68 from the loading area 28, it may be transferred back to the loading area 28 to receive one or more luggage items 20. More specifically, the control system 50 may direct partially filled containers 26 to be transferred back to the loading area 28 from the storage area 66, 68 in order any number of times until a desired number of the shelves 64 of the container 26 are filled.

After the containers 26 have been stored in the storage area 66, 68 for a period of time and are deemed ready to be transferred to the exit conveyor 34, e.g., when they're ready to be processed for an outgoing flight, the method continues by 312 providing instructions to the carrier automatic guided vehicle 40 from the control system 50 to transport the container 26 from the storage area 66, 68 to an unloading area 30. After the instructions are received by the carrier automatic guided vehicle 40, the method proceeds by 314 transporting the container 26 from the storage area 66, 68 to the unloading area 30.

The luggage items 20 may be deemed ready to be transported from the storage area 66, 68 to the unloading areas 30 in response to various triggers. For example, the trigger may be based on one or more of the luggage items 20 on the container 26 having a bag ID that represents that an outgoing flight is approaching. The triggering criteria may relate to individual luggage items 20, or to a group of luggage items 20, collectively.

After the containers 26 are transported to the unloading area 30 from the storage area 66, 68, the method proceeds by 316 unloading the luggage items 20 from the shelves 64 of the container 26 to the exit mechanism 106 with the unloading assembly 72, 172. As mentioned above, the exit conveyor 34 may transport the luggage items 20 to one or more sort stations of the airport for subsequent sorting and loading of the luggage items 20 onto an airplane.

During the foregoing steps, the control system 50 maintains an inventory including the location of all of the luggage items 20 and containers 26, as well as the status (e.g., bag IDs) of the luggage items 20. The control system 50 further links the bag IDs of the luggage items 20 with the containers 26 on which the luggage items 20 are positioned. Accordingly, containers 26 may be automatically retrieved from the storage area 66, 68 and brought to the loading area 28 and unloading area 30 based on various predetermined criteria. For example, a container 26 that includes a plurality of luggage items 20 disposed thereon that have the same bag ID as one another that correlates with an upcoming flight may be retrieved from the storage area 66, 68 and transported to the unloading area 30 in response to an indication that the airplane is ready to receive luggage items 20. In this example, if all of the luggage items 20 are unloaded from the container 26, the controller may remove the bag ID and luggage items 20 from the inventory database and subsequently transport the container 26 back to the storage area 66, 68 or to the loading area 28. Other methods for categorizing and retrieving specific luggage items 20 are presented as follows.

In certain scenarios, a container 26 may be loaded with multiple luggage items 20 that have conflicting bag IDs. As such, it may be desirable to only unload certain luggage items 20 that have a predetermined bag ID and send the rest of the luggage items 20 back to the storage area 66, 68. A method of executing this process is provided in FIG. 6. The method includes 318 identifying at least one luggage item 20 that has a first bag ID and 320 identifying at least one luggage item 20 that has a second bag ID. In this scenario, the step of unloading the luggage items 20 from the container 26 and positioning the luggage items 20 on the exit conveyor 34 with the unloading assembly 72, 172 further includes 322 moving the luggage items 20 that have the first bag ID from the shelves 64 of the first container 26 to the exit conveyor 34 with the unloading assembly 72, 172. Furthermore, the method includes 324 providing instructions to the carrier automatic guided vehicle 40 from the control system 50 to transport the first container 26 from the unloading area 30 back to the storage area 66, 68, and 326 subsequently transporting the first container 26 from the unloading area 30 with the carrier automatic guided vehicle 40 with the luggage items 20 having the second bag ID disposed thereon either back to the storage area 66, 68, or to the loading area 28 to receive more luggage items 20.

Figure 7:
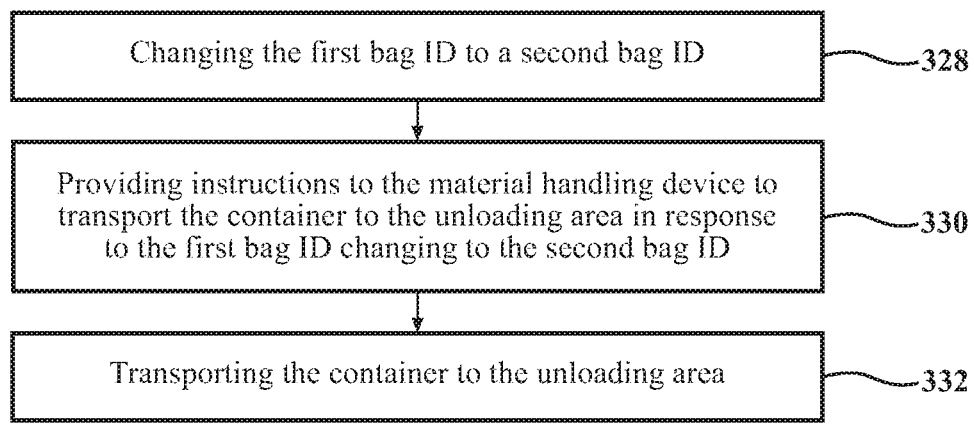
FIG. 7 is a third example method of storing and sequencing luggage items.

With reference to FIG. 7, a method is further provided for overriding current luggage item 20 retrieval criteria in exceptional cases in response to the occurrence of an event. For example, this method may be utilized in the event that a luggage item 20 is scheduled to be transferred to a different flight than originally scheduled as a result of a passenger rescheduling his/her flight. The method includes 328 changing the first bag ID to a second bag ID with the control system 50 in response to a change in a status of the received luggage item 20 (e.g., changing a first bag ID that correlates with the first flight number to a second bag ID that correlates with the second flight number). In this scenario, the second bag ID includes information related to the received luggage item 20 that is different from the information of the first bag ID. After the first bag ID has been changed to the second bag ID, the method includes 330 providing instructions to the carrier automatic guided vehicle 40 from the control system 50 to transport the first container 26 from the storage area 66, 68 to an unloading area 30 in response to a detection of the first bag ID being changed to the second bag ID.

After the carrier automatic guided vehicle 40 receives the instructions, the method proceeds by 332 transporting the first container 26 from the storage 66, 68 area to the unloading area 30 with the material handling device with the received luggage item 20 disposed on the shelf 64 of the first container 26. After the luggage item 20 with the second bag ID is unloaded, the container 26 may be returned to storage area 66, 68 with any remaining luggage items 20 disposed thereon. Alternatively, the container 26 could return to the loading area 28 and the empty shelf 64 could be loaded with a new luggage item 20 that matches the bag ID of the remaining luggage items 20.

Figure 8:
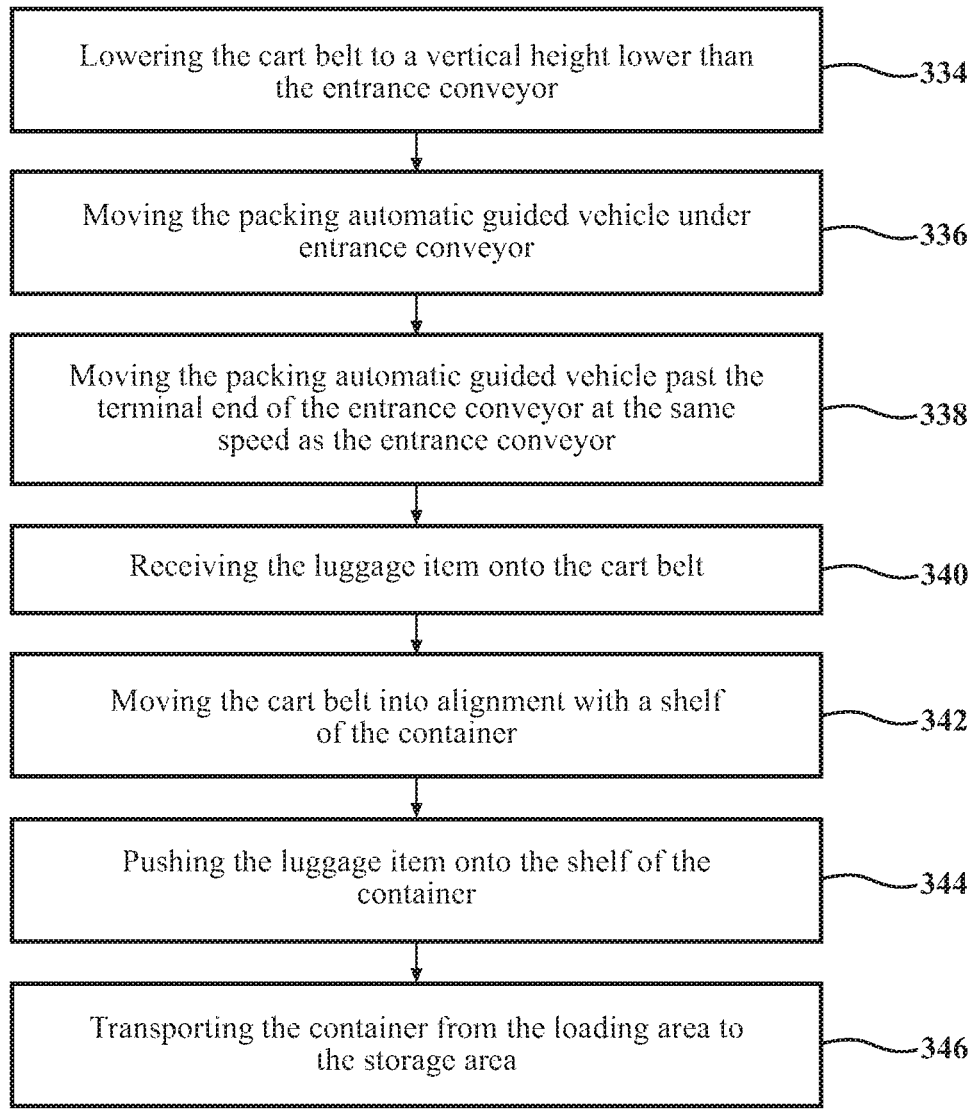
FIG. 8 is a fourth example method of storing and sequencing luggage items.

With reference to FIG. 8, the step of moving the luggage item 20 from the entrance conveyor 32 onto a shelf 64 of the first container 26 with the loading assembly 70, 170 may be performed with the first example embodiments of the loading assembly 70. This method further includes 334 lowering the cart belt 74 of the packing automatic guided vehicle 42 to a vertical height that is lower than that of the belt conveyor of the entrance conveyor 32 and subsequently 336 moving the packing automatic guide vehicle under the entrance conveyor 32 in alignment with the luggage item 20 positioned thereon. The method then proceeds by 338 moving the packing automatic guided vehicle 42 past a terminal end 75 of the entrance conveyor 32 at the same speed as the entrance conveyor 32 and 340 receiving the luggage item 20 onto the cart belt 74 once the packing automatic guided vehicle 42 has moved past the terminal end 75 of the entrance conveyor 32 and the luggage item 20 has dropped from the terminal end 75 of the entrance conveyor 32. In other words, the packing automatic guided vehicle 42 is positioned beneath a luggage item 20 on the entrance conveyor 32 and is instructed to move at the same speed as the entrance conveyor 32 such that it receives the luggage item 20 when the luggage item 20 drops from the terminal end 75 of the entrance conveyor 32. It should be appreciated that the cart belt 74 is stopped during this process.

After the luggage item 20 has been received on the cart belt 74 of the packing automatic guided vehicle 42, the method proceeds by 342 moving the cart belt 74 of the packing automatic guided vehicle 42 into alignment with a selected one of the shelves 64 of the container 26. The cart belt 74 may be moved into alignment with the shelf 64 by way of the lifting mechanism 76. It should be appreciated that the lifting mechanism 76 may be operated while the packing automatic guided vehicle 42 is in motion.

Once the cart belt 74 is in alignment with the shelf 64, the method proceeds by 344 pushing the luggage item 20 from the cart belt 74 of the packing automatic guided vehicle 42 onto the selected shelf 64 of the container 26 with the pusher 78 by actuating the cart belt 74. It should be appreciated that the luggage item 20 may be transferred from the cart belt 74 to the shelf 64 of the container 26 while the container 26 and packing automatic guided vehicle 42 are stationary, or while they are moving at an equal speed as one another. It should also be appreciated that transferring the luggage item 20 while the container 26 and packing automatic guided vehicle 42 are moving at an equal speed may improve throughput by eliminating unnecessary stopping of the components. Finally, the method continues with transporting the container 26 from the loading area 28 to the storage area 66, 68 with a carrier automatic guided vehicle 40 with the luggage item 20 disposed on the selected shelf 64 of the first container 26.

Figure 9:
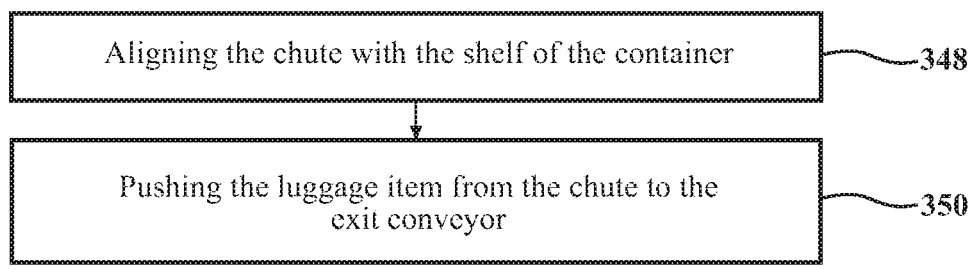
FIG. 9 is a fifth example method of storing and sequencing luggage items.

With reference to FIG. 9, the step of unloading the luggage items 20 from the container 26 and positioning the luggage items 20 on the exit conveyor 34 with the unloading assembly 72, 172 may be performed with the first example embodiment of the unloading assembly 72. This method includes 348 aligning the chute 82 with the selected shelf 64 of the container 26, and subsequently 350 pushing the luggage item 20 with one of the pushing mechanisms 84 from the selected shelf 64 onto the chute 82 to deliver the luggage item 20 to the exit conveyor 34.

Figure 10:
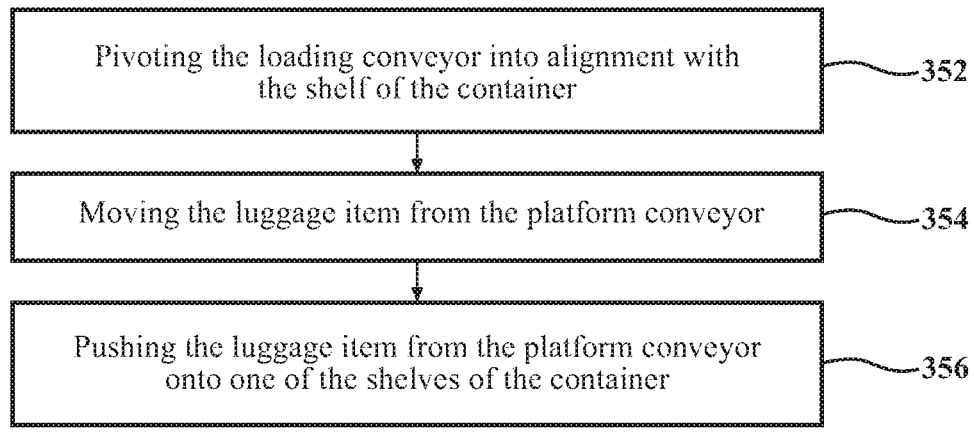
FIG. 10 is a sixth example method of storing and sequencing luggage items.

With reference to FIG. 10, the step of moving the luggage item 20 from the entrance conveyor 32 onto a shelf 64 of the container 26 with the loading assembly 70, 170 may be performed with the second example embodiments of the loading assembly 170. This method includes pivoting the loading conveyor 48 into alignment with a selected one of the platform conveyors 83. After the loading conveyor 48 is aligned with the platform conveyor 83, the method includes 354 moving the luggage item 20 from the entrance conveyor 32 to the selected platform conveyor with the loading conveyor 48. After the luggage item 20 is positioned on the loading conveyor 48, the method proceeds by 356 pushing the luggage item 20 from the selected platform conveyor 83 onto a selected one of the shelves 64 of the container 26 with the pushing device 36.

Figure 11:
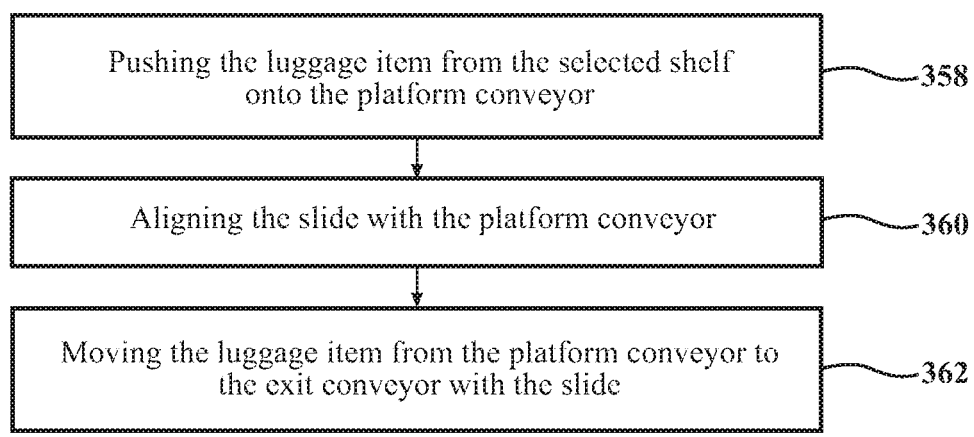
FIG. 11 is a seventh example method of storing and sequencing luggage items.

With reference to FIG. 11, the step of 316 unloading the luggage items 20 from the container 26 and positioning the luggage items 20 on the exit conveyor 34 with the unloading assembly 72, 172 may be performed with the second example embodiment of the unloading assembly 172. This method includes 358 pushing the luggage item 20 from the selected shelf 64 onto a selected one of the platform conveyors 83 with the pushing device 36. Once the luggage item 20 is positioned on the second platform conveyor, the method proceeds by 360 aligning the slide 86 with the selected platform conveyor 83. Finally, the method includes 362 moving the luggage item 20 from the selected platform conveyor 83 to the exit conveyor 34 with the slide 86.

Figure 12:
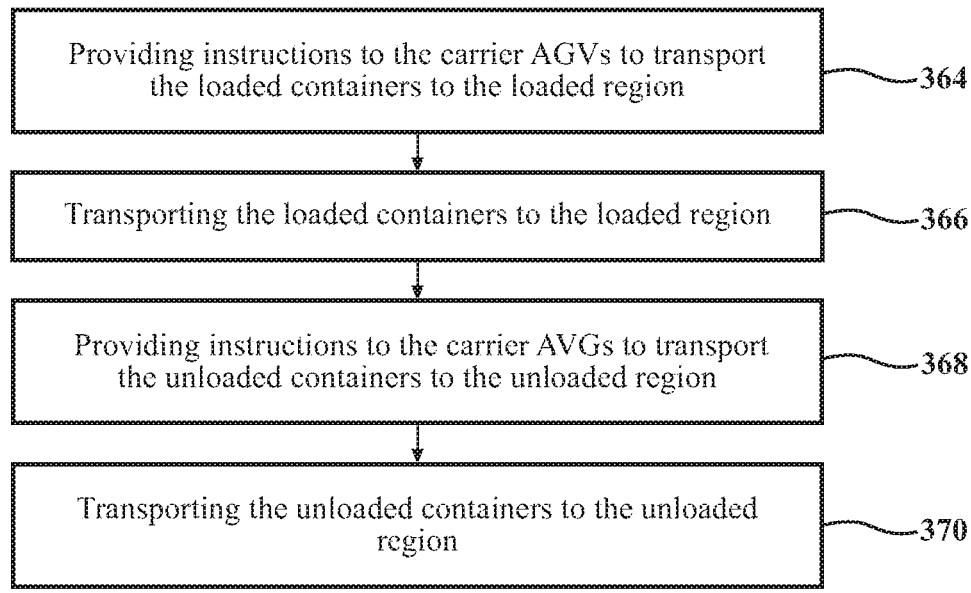
FIG. 12 is an eighth example method of storing and sequencing luggage items.

With reference to FIG. 12, a method of storing the loaded and unloaded containers 26 in an efficient manner by utilizing the loaded and unloaded regions 66, 68 of the storage area 66, 68 is provided. The method includes 364 providing instructions to the carrier automatic guided vehicles 40 from the control system 50 to transport each of the loaded containers 26 that have luggage items 20 disposed thereon to the loaded region 66 of the storage area 66, 68. Once the instructions are received, the method proceeds by 366 transporting the loaded containers 26 to the loaded region 66.

The method continues with 368 providing instructions to the carrier automatic guided vehicles 40 from the control system 50 to transport each of the unloaded containers 26 without luggage items 20 disposed thereon to the unloaded region 68 of the storage area 66, 68. Once the instructions are received, the method continues by 370 transporting the unloaded containers 26 to the unloaded region 68. As mentioned in the foregoing, the loaded region 66 is separate from the unloaded region 68. However, it should be appreciated that the size of the loaded and unloaded regions 66, 68 may be dynamically changed based on current needs. As previously mentioned, the size of the loaded and unloaded regions 66, 68 may be modified by changing the segments/lanes of the pathway 52 which are designated as the loaded and unloaded regions 66, 68. It should be appreciated that once the containers 26 are stored in their appropriate loaded and unloaded region 66, 68, the unloaded containers 26 may be quickly and efficiently retrieved for loading since they are consolidated and positioned close to the loading area 28.

Figure 13:
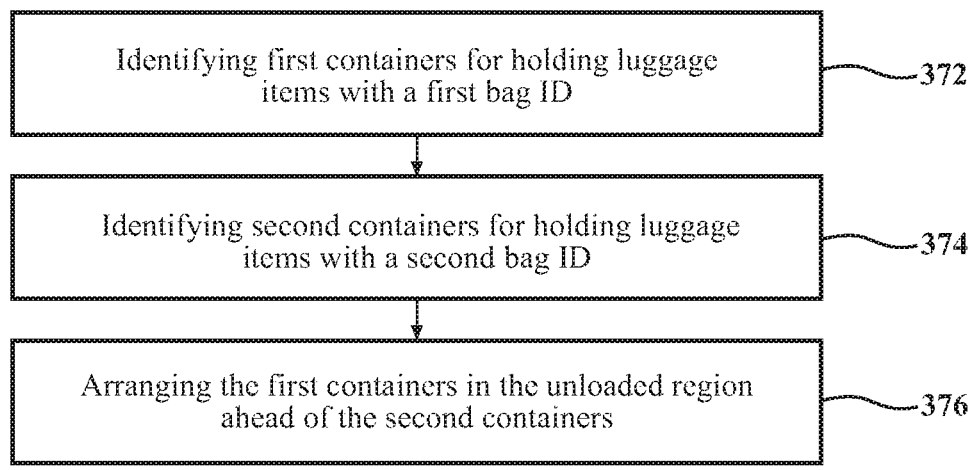
FIG. 13 is a ninth example method of storing and sequencing luggage items.

With reference to FIG. 13, a method of arranging the containers 26 prior to loading the containers 26 to provide for an efficient loading process is disclosed. The method begins with 372 identifying one or more first containers 26 for holding a plurality of luggage items 20 that have a first bag ID. The method proceeds with 374 identifying one or more second containers 26 for holding luggage items 20 that have a second bag ID. The method continues with 376 arranging the first containers 26 in the unloaded region 68 ahead of the second containers 26. It should be appreciated that following this method allows the first containers 26 to be loaded with the luggage items 20 that have the first bag ID prior to loading the second containers 26 with the luggage items 20 that have the second bag ID. Pre-staging the containers 26 in this fashion may reduce the time required to move a container 26 into a loading position in the loading area 28. It should be appreciated that this method may be utilized with any number of containers 26 and any number of bag IDs.

Accordingly, it should be appreciated that the previously described methods of utilizing dynamic luggage assignment criteria along with the strategy of maintaining a pool of locally available containers 26 provide a high level of throughput while achieving optimization of the unloading assembly 72.

It should further be appreciated that utilizing the aforementioned system and methods provides certain advantages over the conventional method of immediately sending luggage items 20 to sort stations after being checked-in by passengers. More specifically, each sort station that is utilized in such conventional methods is an allocation of space, equipment, and personnel for handling the flow of luggage. By utilizing the subject system and method, luggage items 20 that are checked in early may be stored and sequenced in an efficient manner that requires minimal equipment, floor space and manpower.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method for storing and sequencing a plurality of luggage items, said method including:
   receiving at least one of the luggage items into a loading area from an entrance conveyor disposed in the loading area;
   moving the luggage item with a loading assembly from the entrance conveyor onto one of a plurality of shelves of a container positioned on a carrier automatic guided vehicle;
   providing instructions to the carrier automatic guided vehicle from the control system to transport the container from the loading area to a storage area, and transporting the container from the loading area to the storage area with the carrier automatic guided vehicle with the luggage item disposed on the shelf of the container;
   storing the luggage item in the storage area with the luggage item positioned on the container;
   providing instructions to the carrier automatic guided vehicle from the control system to transport the container from the storage area to an unloading area, and transporting the container from the storage area to the unloading area with the carrier automatic guided vehicle with the received luggage item disposed on the shelf of the container;
   moving the luggage item from the shelf of the container to an exit conveyor disposed in the unloading area with an unloading assembly;
   wherein the loading assembly includes a plurality of platform conveyors disposed in vertically stacked relationship with one another with each of the platform conveyors disposed at the same height as one of the shelves of the container, a loading conveyor extending from the entrance conveyor and pivotable relative to the entrance conveyor for being aligned with one of the platform conveyors, and a plurality of first pushing devices each disposed at the same height as one of the platform conveyors;
   said method further includes pivoting the loading conveyor into alignment with a selected one of the platform conveyors;
   moving the luggage item from the entrance conveyor to the selected first platform conveyor with the loading conveyor; and
   pushing the luggage item from the selected first platform conveyor onto a selected one of the shelves of the container with the pushing device.

2. The method as set forth in claim 1 wherein the loading assembly includes a packing automatic guided vehicle having a chassis, a cart belt, a lifting mechanism interconnecting the chassis and the cart belt and providing movement of the cart belt relative to the chassis, and a pusher being moveable relative to the chassis with the cart belt;

the method further includes moving the luggage item from the entrance conveyor onto the cart belt of the packing automatic guided vehicle;

moving the cart belt of the packing automatic guided vehicle into alignment with a selected one of the shelves of the container with the lifting mechanism; and pushing the luggage item from the cart belt of the packing automatic guided vehicle onto the selected shelf of the container with the pusher.

3. The method as set forth in claim 1 wherein the unloading assembly includes a plurality of pushing mechanisms each disposed at the same height as one of the shelves of the container and a chute being pivotable for being aligned with one of the shelves of the container;

the method further includes aligning the chute with the selected shelf of the container; and pushing the luggage item with one of the pushing mechanisms from the selected shelf onto the chute to deliver the luggage item to the exit conveyor.

4. The method as set forth in claim 1 wherein the unloading assembly includes a plurality of slides each extending from the exit conveyor to one of the platform conveyors, and a plurality of second pushing devices each disposed at the same height as one of the platform conveyors;

said method further includes pushing the luggage item from the selected shelf onto a selected one of the platform conveyors with one of the second plurality of pushing devices; aligning the slide with the selected platform conveyor; and moving the luggage item from the selected platform conveyor to the exit conveyor with the slide.

5. A system for storing and sequencing a plurality of luggage items, said system including:

at least one container including a plurality of shelves being vertically stacked on top of one another;

at least one carrier automatic guided vehicle supporting said at least one container;

a storage area for holding said container;

a loading area including an entrance conveyor for receiving the luggage items into said loading area;

a loading assembly disposed in said loading area including a packing automatic guided vehicle having a chassis and a cart belt supported by said chassis for holding the luggage items;

said packing automatic guided vehicle further including a lifting mechanism interconnecting said chassis and said cart belt and providing movement of said cart belt relative to said chassis for aligning said cart belt with one of said shelves of said container;

said packing automatic guided vehicle further including a pusher being moveable with said cart belt for pushing the luggage item from said cart belt onto said shelf of said container with said container positioned on said carrier automatic guided vehicle;

an unloading area including an exit conveyor for removing the luggage items from said unloading area;

an unloading assembly disposed in said unloading area and configured to move the luggage item from said shelf of said container onto said exit conveyor;

a control system wirelessly connected to said carrier automatic guided vehicle for controlling the movement of said carrier automatic guided vehicle; and said control system further connected to said packing automatic guided vehicle and said unloading assembly and configured to instruct said packing automatic guided vehicle to move the luggage item from said entrance conveyor onto one of said plurality of shelves of said container with said container positioned on said carrier automatic guided vehicle, and configured to instruct said carrier automatic guided vehicle to move said container with the luggage item disposed thereon from said loading area to said storage area, and configured to instruct said carrier automatic guided vehicle to store said container with the luggage item disposed thereon for a period of time, and configured to instruct said automatic guided vehicle to move said container with the luggage item disposed thereon from said storage area to said unloading area, and configured to instruct said unloading assembly to move the luggage item from said shelf of said container positioned on said automatic guided vehicle onto said exit conveyor.

6. The system as set forth in claim 5, further comprising:

said unloading assembly disposed in said unloading area including a chute being pivotable relative to said exit conveyor for being aligned with one of said shelves of said container; and said unloading assembly further including a plurality of pushing mechanisms each disposed at the height of one of said shelves of said container for pushing the luggage item from said shelf onto said chute for moving the luggage item from said shelf to said exit conveyor.

7. A system for storing and sequencing a plurality of luggage items, said system including:

at least one container including a plurality of shelves being vertically stacked on top of one another;

a storage area for holding said container;

a loading area including an entrance conveyor for receiving the luggage items into said loading area;

an unloading area including an exit conveyor for removing the luggage items from said unloading area;

at least one pathway extending between said storage area, said loading area, and said unloading area;

at least one carrier automatic guided vehicle supporting said at least one container for transporting said container between said storage area, said loading area, and said unloading area;

a loading assembly disposed in said loading area and configured to move the luggage item from said entrance conveyor onto one of said shelves of said container with said container positioned on said carrier automatic guided vehicle;

an unloading assembly disposed in said unloading area and configured to move the luggage item from said shelf of said container onto said exit conveyor;

a control system wirelessly connected to said carrier automatic guided vehicle for controlling the movement of said carrier automatic guided vehicle along said at least one pathway between said storage area, said loading area, and said unloading area;

said control system further connected to said loading assembly and said unloading assembly and configured to instruct said loading assembly to move the luggage item from said entrance conveyor onto one of said plurality of shelves of said container with said container positioned on said carrier automatic guided vehicle, and configured to instruct said carrier automatic guided vehicle to move said container with the luggage item disposed thereon from said loading assembly to said storage area, and configured to instruct said carrier automatic guided vehicle to store said container with the luggage item disposed thereon in said storage area for a period of time; and configured to instruct said automatic guided vehicle to move said container with the luggage item disposed thereon from said storage area to said unloading assembly, and configured to instruct said unloading assembly to move the luggage item from said shelf of said container positioned on said automatic guided vehicle onto said exit conveyor; and wherein said loading assembly includes a plurality of platform conveyors disposed in vertically stacked relationship with one another with each of said platform conveyors disposed at the same height as one of said shelves of said conveyor; and said loading assembly further includes a loading conveyor extending from said entrance conveyor and pivotable relative to said entrance conveyor for being aligned with one of said platform conveyors for moving the luggage item from said entrance conveyor onto one of said platform conveyors, and a plurality of pushing devices each disposed at the same height as one of said platform conveyors for pushing the luggage item from said platform conveyor onto one of said shelves of said container.

8. A system as set forth in claim 7 wherein said loading assembly includes a packing automatic guided vehicle independent from said carrier automatic guided vehicle and having a chassis and a cart belt rotatably supported by said chassis for holding and moving the luggage items while disposed thereon;

said packing automatic guided vehicle further includes a lifting mechanism interconnecting said chassis and said cart belt, and configured to align said cart belt with one of said shelves of said container; and said packing automatic guided vehicle further includes a pusher being slideable relative to said cart belt for pushing the luggage item from said cart belt onto said shelf of said container.

9. A system as set forth in claim 7 wherein said unloading assembly includes a chute being pivotable relative to said exit conveyor for being aligned with one of said shelves of said container; and said unloading assembly further includes a plurality of pushing mechanisms each disposed at the height of one of said shelves of said container for pushing the luggage item from said shelf onto said chute for moving the luggage item from said shelf to said exit conveyor.

10. A system as set forth in claim 7 wherein said unloading assembly is disposed in said unloading area and includes a plurality of second pushing devices each disposed at the same height as one of said platform conveyors for pushing the luggage item from said shelf of said container onto one of said platform conveyors, and a plurality of slides each extending from said exit conveyor to one of said platform conveyors for moving the luggage item from said platform conveyors to said exit conveyor.

11. A method for storing a plurality of luggage items, said method including:

receiving at least one of the luggage items into a loading area from an entrance conveyor disposed in the loading area;

providing a container including a plurality of shelves being vertically stacked on top of one another supported by a carrier automatic guided vehicle;

providing at least one loading assembly in the loading area including a plurality of platform conveyors disposed in vertically stacked relationship with one another with each of the platform conveyors disposed at the same height as one of the shelves of the container, a loading conveyor extending from the entrance conveyor and pivotable relative to the entrance conveyor for being aligned with one of the platform conveyors, and a plurality of first pushing devices each disposed at the same height as one of the platform conveyors;

pivoting the loading conveyor into alignment with a selected one of the platform conveyors;

moving the luggage item from the entrance conveyor to the selected first platform conveyor with the loading conveyor;

pushing the luggage item from the selected first platform conveyor onto a selected one of the shelves of the container with the pushing device while the container is supported by the carrier automatic guided vehicle;

transporting the container from the loading area to the storage area with the carrier automatic guided vehicle with the luggage item disposed on the selected shelf of the first container;

storing the luggage item in the storage area with the luggage item positioned on the container; and transporting the container from the storage area to the unloading area with the carrier automatic guided vehicle with the received luggage item disposed on the shelf of the container.

12. The method as set forth in claim 11 wherein the unloading area includes an exit conveyor;

providing at least one unloading assembly in the unloading area including a plurality of slides each extending from the exit conveyor to one of the platform conveyors, and a plurality of second pushing devices each disposed at the same height as one of the platform conveyors;

pushing the luggage item from the selected shelf onto a selected one of the platform conveyors with one of the second plurality of pushing devices; aligning the slide with the selected platform conveyor; and moving the luggage item from the selected platform conveyor to the exit conveyor with the slide.

13. A method for storing and sequencing a plurality of luggage items, said method including:

receiving at least one of the luggage items into a loading area from an entrance conveyor disposed in the loading area;

moving the at least one luggage item from the entrance conveyor onto a horizontally-oriented belt-conveyor type cart belt of a packing automatic guided vehicle, wherein the packing automatic guided vehicle has a chassis, the cart belt a lifting mechanism interconnecting the chassis and the cart belt and providing movement of the cart belt relative to the chassis, and a pusher being moveable relative to the chassis;

moving the cart belt of the packing automatic guided vehicle into alignment with a selected one of a plurality of shelves of a container with the lifting mechanism, wherein the shelves of the container are vertically stacked on top of one another;

transporting the container from the loading area to a storage area with a carrier automatic guided vehicle with the container supported by the carrier automatic guided vehicle and with the luggage item disposed on the selected shelf of the container;

storing the luggage item in the storage area with the luggage item positioned on the shelf of the container for a period of time;

transporting the container from the storage area to an unloading area with the carrier automatic guided vehicle with the luggage item disposed on the selected shelf of the first container; and wherein said packing automatic guided vehicle is movable independent and apart from said carrier automatic guided vehicle;

wherein the unloading area includes an exit conveyor for removing the luggage item from the unloading area;

providing at least one unloading assembly in the unloading area including a plurality of pushing mechanisms each disposed at the same height as one of the shelves of the container and a chute being pivotable relative to the exit conveyor for being aligned with one of the shelves of said container;

pivoting a chute of an unloading assembly such that it is aligned with the selected shelf of the container, wherein the unloading assembly includes a plurality of pushing mechanisms each disposed at the same height as one of the shelves of the container and the chute being pivotable relative to the exit conveyor for being aligned with one of the shelves of the container; and pushing the luggage item with one of the pushing mechanisms from the selected shelf onto the chute to deliver the luggage item to the exit conveyor.

14. The method as set forth in claim 13 further comprising:

pushing the luggage item from the cart belt of the packing automatic guided vehicle onto the selected shelf of the container with a pusher.

15. A system for storing and sequencing a plurality of luggage items, said system including:

at least one container including a plurality of shelves being vertically stacked on top of one another;

a storage area for holding said container;

a loading area including an entrance conveyor for receiving the luggage items into the loading area;

a loading assembly disposed in said loading area including a plurality of platform conveyors disposed in vertically stacked relationship with one another with each of said platform conveyors disposed at the same height as one of said shelves of said container; and said loading assembly further including a loading conveyor extending from said entrance conveyor and pivotable relative to said entrance conveyor for being aligned with one of said platform conveyors for moving the luggage item from said entrance conveyor onto one of said platform conveyors, and a plurality of pushing devices each disposed at the same height as one of said platform conveyors for pushing the luggage item from said platform conveyor onto one of said shelves of said container.

16. The system as set forth in claim 15 further including an unloading area including an exit conveyor for removing the luggage items from the unloading area; and an unloading assembly disposed in said unloading area and including a plurality of second pushing devices each disposed at the same height as one of said platform conveyors for pushing the luggage item from said shelf of said container onto one of said platform conveyors, and a plurality of slides each extending from said exit conveyor to one of said platform conveyors for moving the luggage item from said platform conveyors to said exit conveyor.

17. A method for storing and sequencing a plurality of luggage items, said method including:

receiving a plurality of luggage items into a loading area from an entrance conveyor disposed in the loading area;

moving each of the luggage items from the entrance conveyor onto one of a plurality of shelves of one of a plurality of containers with a loading assembly;

providing instructions to a carrier automatic guided vehicle from a control system to transport each of the containers having luggage items disposed thereon to a loaded region of a storage area that is separate from an unloaded region of the storage area which includes at least one container without luggage items stored thereon;

wherein said loading assembly is detached from said carrier automatic guided vehicle;

storing the luggage item in the loaded region of the storage area with the luggage item positioned on the container and with the container positioned on the carrier automatic guided vehicle; and providing instructions to the carrier automatic guided vehicle from the control system to transport the container from the loaded region of the storage area to an unloading area, and transporting the container from the loaded region of the storage area to the unloading area with the carrier automatic guided vehicle with the received luggage item disposed on the one of the plurality of shelves of the container;

wherein the loaded region of the storage area is defined by a plurality of loaded region pathways upon which the carrier automatic guided vehicle is configured to follow during transportation of the containers with the luggage items disposed thereon, and wherein the unloaded region of the storage area is defined by a plurality of unloaded region pathways upon which the carrier automatic guided vehicle is configured to follow during transportation of the containers without luggage items disposed thereon.

* * * * *